(12) United States Patent
Katz et al.

(10) Patent No.: US 11,928,951 B2
(45) Date of Patent: \*Mar. 12, 2024

(54) POINT-OF-SALE TERMINAL WITH INTEGRATED EMERGENCY SERVICES REQUEST CAPABILITY

(71) Applicant: National Retail Solutions, Inc., Newark, NJ (US)

(72) Inventors: Elie Y. Katz, Teaneck, NJ (US); Harold Jeffrey Goldberg, Lakewood, NJ (US)

(73) Assignee: National Retail Solutions, Inc., Newark, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/692,267

(22) Filed: Mar. 11, 2022

(65) Prior Publication Data

US 2022/0198907 A1  Jun. 23, 2022

Related U.S. Application Data

(63) Continuation of application No. 16/233,688, filed on Dec. 27, 2018, now Pat. No. 11,302,173.

(51) Int. Cl.
*G08B 21/18* (2006.01)
*G06Q 20/20* (2012.01)
*G08B 25/10* (2006.01)

(52) U.S. Cl.
CPC ......... *G08B 21/182* (2013.01); *G06Q 20/206* (2013.01); *G08B 25/10* (2013.01)

(58) Field of Classification Search
CPC ............... G06Q 20/20; G06Q 30/0268; G06Q 20/3276; G06Q 30/0613; G06Q 30/0633; G06Q 20/3274; G06F 16/9554; H04M 1/2535
See application file for complete search history.

(56) References Cited

U.S. PATENT DOCUMENTS

| | | | |
|---|---|---|---|
| 9,940,612 B1 * | 4/2018 | Hamilton | G06Q 20/4012 |
| 2005/0009536 A1 * | 1/2005 | Ito | G08B 21/0297 |
| | | | 455/414.1 |
| 2010/0008478 A1 * | 1/2010 | Arao | H04M 1/2535 |
| | | | 379/37 |
| 2013/0144731 A1 * | 6/2013 | Baldwin | G06Q 20/3274 |
| | | | 705/17 |

(Continued)

*Primary Examiner* — Mirza F Alam
(74) *Attorney, Agent, or Firm* — Maier & Maier, PLLC

(57) ABSTRACT

A point-of-sale terminal is used to process purchases by a customer during normal operation. However, the point-of-sale terminal also may receive, aggregate and/or process information measured by sensors that are co-located with or in the vicinity of the point-of-sale terminal. The point-of-sale terminal may receive information from at least one sensor that indicates that the at least one sensor has sensed a measureable parameter that is outside of a threshold range; establish at least one communication channel with at least one third-party based on the indication that the at least one sensor has sensed a measureable parameter that is outside of the threshold range; and send to the at least one third party at least one communication relating to the at least one sensor indicating that the at least one sensor has sensed a measureable parameter that is outside of the threshold range.

20 Claims, 2 Drawing Sheets

(56) References Cited

U.S. PATENT DOCUMENTS

| | | | | |
|---|---|---|---|---|
| 2016/0005020 | A1* | 1/2016 | Fernando | G06Q 20/202 |
| | | | | 705/21 |
| 2017/0277947 | A1* | 9/2017 | Burke | G06V 20/52 |
| 2018/0253805 | A1* | 9/2018 | Kelly | G06Q 20/385 |
| 2018/0285852 | A1* | 10/2018 | Matsui | G07G 1/12 |
| 2019/0251541 | A1* | 8/2019 | Etzion | G06F 16/9554 |

* cited by examiner

POINT-OF-SALE TERMINAL WITH INTEGRATED EMERGENCY SERVICES REQUEST CAPABILITY

CROSS-REFERENCE TO RELATED APPLICATIONS

This application is a continuation of and claims the benefit of U.S. application Ser. No. 16/233,688, filed on Dec. 27, 2018; the entire contents of which are incorporated herein by reference.

FIELD OF INVENTION

The present invention is directed to a point-of-sale terminal with integrated sensor aggregation capabilities, and, in one embodiment, to a touchscreen-based point-of-sale terminal that can aggregate sensor information and communicate "out-of-normal" information to a configurable set of recipients.

DISCUSSION OF THE BACKGROUND

Store owners of bodegas, groceries and liquor stores are increasingly opting to be open extended hours at night, some even 24 hours, allowing them to serve customers around the clock and to increase their revenue. However, more experience employees that are aware of the normal operating parameters of various pieces of equipment do not work during all shifts of a store's operations. Moreover, not all stores are open 24 hours, so some conditions (e.g., smoke, fire, water, glass breakage, equipment malfunctioning) may need to be detected rapidly even when the store is empty.

BRIEF DESCRIPTION OF THE DRAWINGS

The following description, given with respect to the attached drawings, may be better understood with reference to the non-limiting examples of the drawings, wherein.

DISCUSSION OF THE PREFERRED EMBODIMENTS

Figure 1:
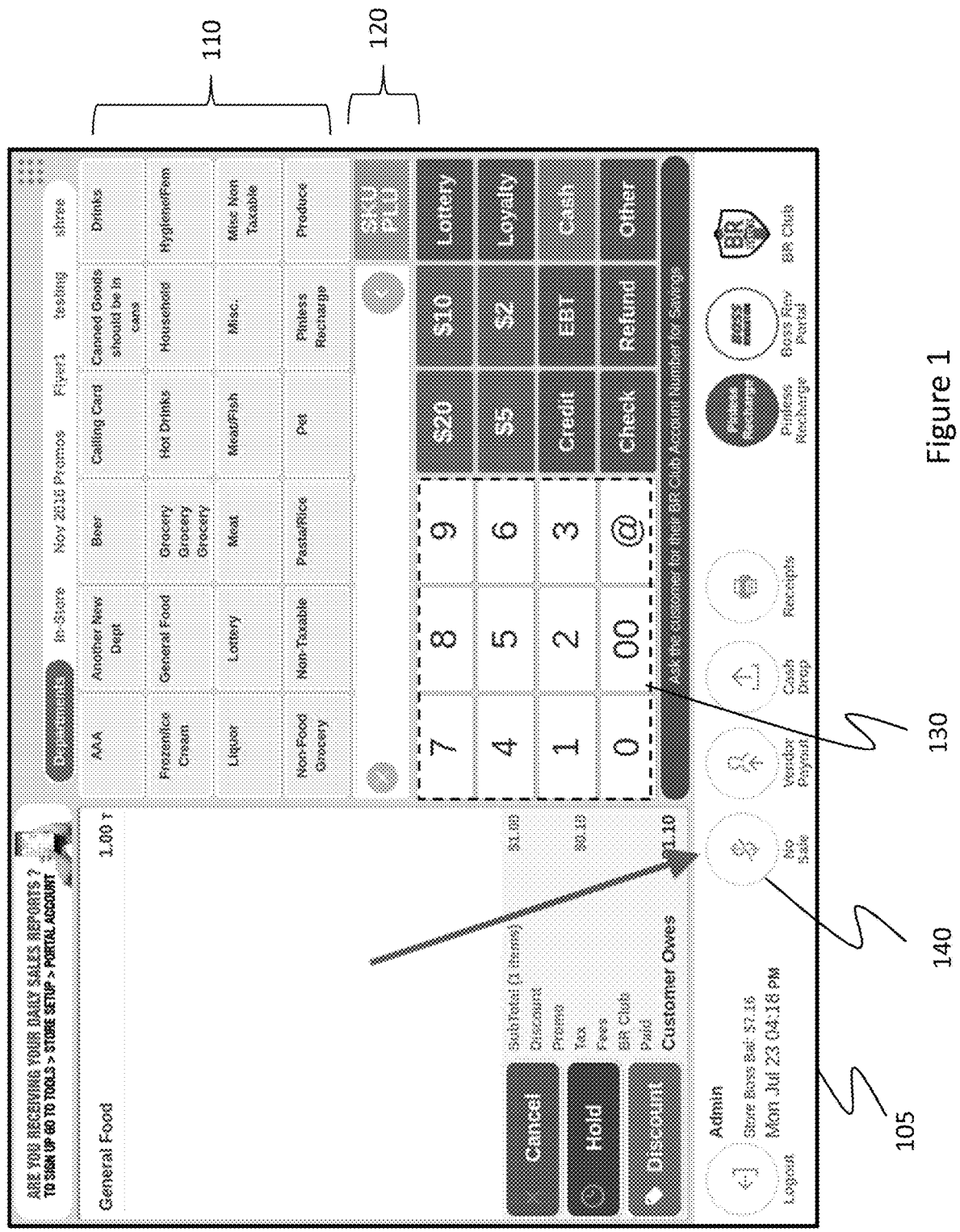
FIG. 1 is a mock-up of a touchscreen of a point-of-sale terminal as would be used in a convenience store.
Figure 2:
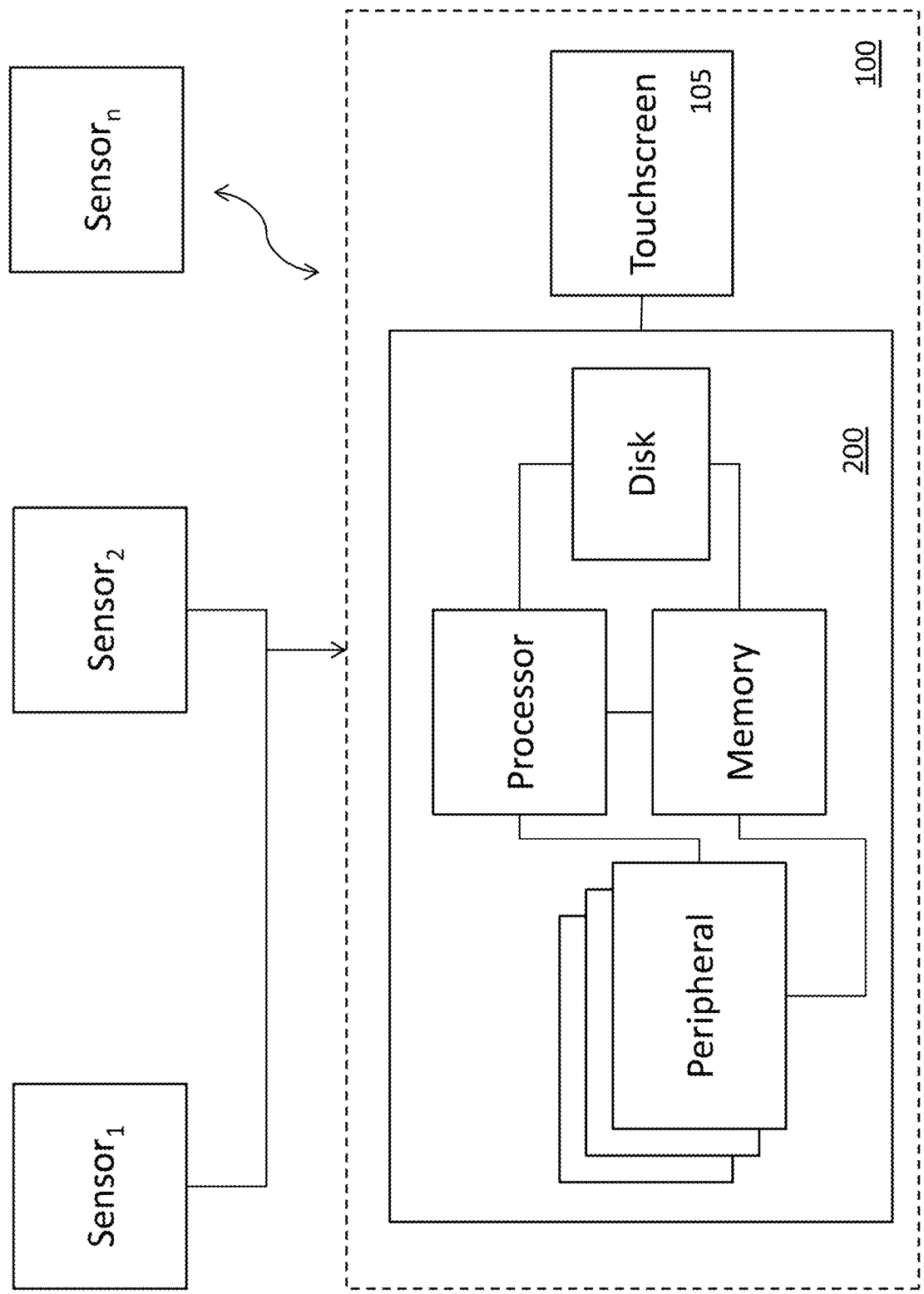
FIG. 2 is a block diagram of an exemplary point-of-sale terminal according to a first exemplary embodiment.

Turning to FIG. 1, a touchscreen 105 of a point-of-sale (POS) terminal 100 (FIG. 2) as would be used in a convenience store is illustrated. The touchscreen 105 is connected to (e.g., by a wired or a wireless connection) or integrated with a computer 200 (FIG. 2) that generates the image displayed on the touchscreen 105 (using a processor under the control of computer instructions stored in a non-transitory computer memory (e.g., DRAM, SRAM, FRAM, FlashROM, ROM)). In addition, the computer is connected to (e.g., by a wired or a wireless connection) or integrated with a cash drawer that opens in response to commands entered on the touchscreen 105. The computer 200 (FIG. 2) typically includes a computer processor, computer memory and a number of peripherals (e.g., at least one disk drive, at least one USB connector, a Bluetooth transceiver, a barcode reader, a scale, a printer, a safe, and at least one communications adapter for connecting to processing systems for one or more of credit cards, debit cards, and prepaid telephone cards). The at least one disk drive stores computer code (e.g., operating system code (such as Windows or Linux) and application code) to be loaded into the computer memory to cause the processor to implement functions expressed by the code. One of the main functions of the application code loaded into the computer memory is for generating a user interface on the touchscreen display and for responding to commands entered. Such application code may be in the form of executable or interpretable code (e.g., Python) as long as it can generate a display and respond to touchscreen commands. In one embodiment, the application code loaded into the computer memory that generates the user interface on the touchscreen display is configurable (e.g., by reading configuration files at start-up) so that the content and layout of the touchscreen can be configured to the environment that it is going to be used in. For example, the "Liquor" button may be configurably replaced by another button if the store does not sell liquor.

In normal operation, the point-of-sale terminal is used to process purchases by a customer. A cashier may utilize a barcode scanner connected to the point-of-sale terminal to speed entry of the items being purchased. The cashier also may utilize "category" buttons 110 to facilitate purchase of items that do not have a barcode (or when the barcode is missing or unreadable). The touchscreen 105 further may include a SKU/PLU area 120 for manually entering a SKU/PLU for an item being processed (e.g., purchased or returned). By activating the SKU/PLU area 120, the cashier can then use the numeric keypad area 130 to enter the SKU/PLU for the current item. (Alternatively, the point-of-sale terminal may include an external keypad or keyboard that can be used instead of the numeric keypad area 130 for all user interactions described herein without departing from the teachings of the present application.)

In an emergency operation, the cashier activates an "emergency button" 140 that is preferably labeled something inconspicuous (e.g., "No sale"). In fact, the emergency button 140 can act as a normal button during non-emergency situations. For example, when the cashier does want to utilize the emergency button 140 as an actual "no sale" button, the cashier just presses the emergency button 140 followed by a non-emergency code (e.g., "123") entered using the numeric keypad area 130. Alternatively, when the cashier wants to indicate an emergency situation, the cashier presses the emergency button 140 followed by an emergency code (e.g., "911", "119", or by some emergency prefix (such as "**") followed by the non-emergency code) entered using the numeric keypad area 130. In another embodiment, the emergency button 140 is activated and held for at least a period of time that is longer than a normal activation of the button (e.g., 2 seconds rather than a normal 0.5 second push). In another embodiment, the emergency button 140 is activated a number of times in quick succession (e.g., 4 times in under 2.5 seconds) to indicate an emergency.

Additional mechanisms can be used to indicate an emergency situation instead of using the emergency button plus a code. For example, the cashier can scan a special bar code or reserved item using the barcode scanner of the point-of-sale terminal. Similarly, the cashier can enter a special key sequence (e.g., a quantity of 911, or 911 SKU) on the touchscreen or on an associated keypad.

The cashier additionally may indicate that help is needed by activating a special call-for-help button (e.g., under the counter) connected to the POS via USB, serial port or wireless technology, including a cell phone, smart watch, or even a health monitoring device.

The cashier additionally may indicate that help is needed by making a predefined gesture or set of gestures on the POS touchscreen or on an associated touch device. For example, by drawing a "9" or an "H" on the touchscreen 105, the point-of-sale terminal detects that an emergency condition is occurring. In another embodiment, the emergency gesture may be dragging one's finger across multiple buttons on the touchscreen 105 in quick succession. The gesture may be either a single finger gesture or a multi-finger gesture. Alternative gestures include "mid-air" gestures that are detected by a vision processing input device such as a Kinect adapter.

Each of the above techniques for indicating that an emergency condition exists can be monitored using programming callback functions inside the application providing the point-of-sale graphical user interface, and the programming callback functions specify what action is to be taken when a graphical user interface control (e.g., button or icon) is interacted with by a user (e.g., touched, held, released, dragged, or swiped). The action to be taken may be in the form of a programming routine that is run using parameters (or variable values) specified at at least one of: when the call back is registered and when the interaction with the control occurs. For example, the application may register a callback functions that are triggered when the "No sale" button is clicked that interact with callback functions that are triggered when the numeric buttons/icons are depressed such that the application can determine if the non-emergency PIN, the emergency PIN or an incorrect PIN are entered. Alternatively, the callback functions may be replaced by "polling" which continually checks for interactions with the touchscreen and which calls programmed functions instead to track where in the testing for an emergency situation the application is (e.g., using a state machine to track what icons have been interacted with and in what order).

Once the cashier has indicated that an emergency condition occurs, the cash drawer opens, but the point-of-sale terminal attempts to utilize at least one communications adapter to notify the police of the emergency condition. For example, in the case of a monitored store, the point-of-sale terminal sends at least one IP-based message to the monitoring service responsible for monitoring the store. In one embodiment, the IP-based message is transmitted using a connection-oriented communication protocol (e.g., TCP/IP), and the IP-based message includes store-identifying information (e.g., at least one of a store identifier, a caller ID, or an Account ID) which is used to lookup store information that will enable the monitoring service to dispatch police. In addition, one or more cameras connected to or in communication with the point-of-sale terminal can be requested by the point-of-sale terminal, in response to the emergency condition, to transmit at least one picture, audio clip, or video clip to the point-of-sale terminal so that the picture, audio clip, and/or video clip can be sent as part of the message. As would be appreciated by those of skill in the art, an exemplary camera that could capture the robber's image is the forward facing camera that is used on a number of point-of-sale terminals, although other cameras (e.g., a door mounted camera or a camera behind the counter) could be used instead. Likewise, streaming audio and/or video can be sent to at least one third party (e.g., police and/or a store manager) until the emergency condition is canceled.

In one embodiment, the IP-based message is a POST message using the HTTP or HTTPS protocols where the application, as part of the POST message processing, creates a TCP/IP-based socket connection to the remote server, and posts (or sends) the corresponding data relating to the emergency situation to a specified URL. The data relating to the emergency situation may be read from a configuration file, generated dynamically (e.g., by reading a real-time clock), or a combination of both. The information transfer using the POST message may be repeated a number of times (and across multiple interfaces) in the presence of communications failures. The system may include a configuration file that specifies what server to connect to and what the order of communications interfaces to use is. The data in the POST message may be encoded using an untagged format (e.g., plain text) or using a tagged format (e.g., HTML, XML, or JSON).

The IP-based message also may include cashier-centric information (i.e., information about the cashier on site, such as a name and a description of the cashier). Alternatively, the IP-based message may be a voice-recording with store-identifying information and optionally cashier-centric information. The monitoring service likewise can receive the information via a text or SMS message. The IP-based communication can be over any wired or wireless communications interface, such as, but not limited to, WiFi, cellular, Zigbee, LORAN, and mesh networks. Additionally, the point-of-sale terminal can communicate with a third-party (directly or using a dialer) using other radio wave-based communications (e.g., in the cordless phone spectrum, or in unregulated RF spectrums), or generally using sound waves (including but not limited to ultrasonic waves) and light waves (including but not limited to infrared waves).

In an alternative embodiment, rather than using an IP-based message, the point-of-sale terminal may dial an alarm monitoring company using an attached dialer unit (via USB, serial port or other wireless technology). The point-of-sale terminal will cause the account or other information identifying the store to be transmitted to the alarm monitoring company (e.g., using caller ID information or embedded in the message). In one embodiment, the point-of-sale terminal controls a previously paired on-premises cell phone to act as the dialer using a Bluetooth connection between the point-of-sale terminal and the cell phone. Based on what device is paired with the point-of-sale terminal, the system may (e.g., using a database of employees logged on when the pairing occurred) send employee information to police or a monitoring service so that the police can be informed of relevant information about the employee(s) they are likely to encounter (e.g., what the employee looks like and what language skills the employee has).

In yet another embodiment, if the store does not subscribe to a monitoring service, an IP message may instead be transferred to internet-based dialing service such that a pre-recorded voice message containing store information can be played (e.g., on loop) for one or more recipients of the call(s) from the terminal once the call(s) is/are answered. In one embodiment, the recipient of the call is a store manager or owner, but in another embodiment the recipient of the call is a police dispatcher (e.g., called using "911" or a direct dial number of a local precinct). The POS terminal likewise can be configured to make multiple calls thereby alerting both the store owner/manager and the police dispatcher. Alternatively, or in addition, the point-of-sale terminal can cause caller ID information to be embedded in the message to identify the store. The store owner/manager and the police dispatcher likewise can receive the information via a text or SMS message.

In an alternative embodiment, rather than using an IP-based message, the point-of-sale terminal may dial the store owner/manager or police dispatcher directly using an attached dialer unit (via USB, serial port or other wireless technology). The point-of-sale terminal will cause the account or other information and/or a voice message identifying the store to be transmitted to the call recipient. In one such embodiment, the point-of-sale terminal controls a previously paired on-premises cell phone to act as the dialer using a Bluetooth connection between the point-of-sale terminal and the cell phone.

In at least one configuration, the system is configured to contact a communications repeater which is configured to contact multiple recipients on behalf of the system. For example, the system could remotely connect to a server (e.g., using IP-based communication over a wired or wireless connection), send emergency situation information to the connected server, and then the server could handle the contacting of additional third parties (e.g., the store manager, the alarm company and emergency services (such as the police)) in an order specified on the server. Thus, the order of calls could be changed without needing access to the point of sale system.

In configurations where the point-of-sale terminal is connected (by a wired—or a wireless-connection) to video equipment, the point-of-sale terminal may send a command to the video equipment to "start recording" or "mark the recording" for later retrieval. "Marking" the recording for later retrieval may include commanding the system to note the date and/or time of the indicated emergency situation. In addition, the point-of-sale terminal may be configured to send a command to the video equipment video to switch to persistent recording (instead of running on a loop) and to store the video until the disable code is used.

The point-of-sale terminal may further act as a hub for receiving, aggregating and/or processing information from sensors co-located with or near the point-of-sale terminal. Exemplary sensors that can communicate with the POS include, but are not limited to: (1) a pressure sensor, (2) a water sensor, (3) a switch, (4) a movement sensor; (5) a temperature sensor, (6) an RF sensor (e.g., a light sensor or an infrared sensor), (7) a strain gauge, (8) a speed sensor, (9) a level sensor, (10) an acoustic sensor, and (11) an accelerometer. The sensors can send information to the point-of-sale terminal using at least one or a combination of: on demand, via periodic polling, or on change to the POS. Moreover, the sensors may send information to the point-of-sale terminal either directly or indirectly via a gateway. The sensors can communicate in any number of ways, including wired communication (e.g., hard-wired serial, metallic contact or I2C or similar techniques), as well as wireless communication (e.g., Bluetooth, WiFi, Zigbee, or similar signaling methods). The POS may support these interfaces directly, or employ a signaling gateway that converts from one protocol to another.

Thresholds can be set for alarm conditions to identify when a measurement is out of a specified range (e.g., a freezer or ice machine is too warm, an AC unit is running hot, a smoke or heat sensor indicates smoke or abnormal heat, a water sensor indicates that water is present where it shouldn't be (such as in a freezer, in an ice machine, or by a drain)). The thresholds may further be time-dependent (e.g., (a) the internal temperature of the store that must be reached to be abnormal may be higher during non-business hours than during business hours, of (b) a door that may be open at sometimes may not be open at other times (such as when the business is closed)). Sensors and/or the point-of-sale terminal also may be configured to block/filter repetitive alarms within a certain time period so that repeated calls to third-parties are avoided. Similar to the communications triggered by the presence of an emergency condition, the alarm condition causes a communication channel to be established so that at least one communication can be sent, e.g., to a monitoring company, to at least one recipient directly, or both. The third-parties to communicate with preferably can be configured on a sensor-by-sensor basis and be time dependent (e.g., (a) when smoke is detected during business hours the owner is contacted first before rolling over to contacting the monitoring company and/or the fire department, but when smoke is detected after hours the monitoring company and/or the fire department is contacted first before subsequently contacting the store owner, (b) when a fire is detected, the monitoring company and/or the fire department is contacted first before subsequently contacting the store owner, (c) the police department is contacted when a door opens during non-business hours, but the owner is contacted when the same door is left open for more than a threshold period of time during business hours).

While certain configurations of structures have been illustrated for the purposes of presenting the basic structures of the present invention, one of ordinary skill in the art will appreciate that other variations are possible which would still fall within the scope of the appended claims.

The invention claimed is:

1. A point-of-sale terminal comprising:
a touchscreen;
a computer processor; and
a non-transitory computer memory, wherein the non-transitory computer memory stores computer instructions for controlling the computer processor to perform the steps of:
wirelessly receiving information from at least one sensor external to the point-of-sale terminal that indicates that the at least one sensor has sensed a measurable parameter that is outside of a threshold range, wherein the at least one sensor is selected from the group consisting of (1) a pressure sensor, (2) a switch, (3) a water sensor, (4) a strain gauge, (5) a temperature sensor, (6) an acoustic sensor, and (7) a level sensor;
establishing, by the point-of-sale terminal, at least one communication channel with at least one third-party based on the indication that the at least one sensor has sensed the measurable parameter that is outside of the threshold range; and
sending to the at least one third party at least one communication relating to the at least one sensor indicating that the at least one sensor has sensed the measurable parameter that is outside of the threshold range.

2. The point-of-sale terminal as claimed in claim 1, wherein the at least one third-party is at least one of a monitoring service and a remotely-located store owner.

3. The point-of-sale terminal as claimed in claim 1, wherein establishing, by the point-of-sale terminal, the at least one communication channel comprises establishing, by the point-of-sale terminal, a connection between the point-of-sale terminal and the at least one third party using mesh network-based communications.

4. The point-of-sale terminal as claimed in claim 1, wherein establishing, by the point-of-sale terminal, the at least one communication channel comprises establishing, by the point-of-sale terminal, an IP-based communication connection between the point-of-sale terminal and the at least one third party.

5. The point-of-sale terminal as claimed in claim 1, wherein establishing, by the point-of-sale terminal, the at least one communication channel comprises establishing, by the point-of-sale terminal, a telephone connection between the point-of-sale terminal and the at least one third party.

6. The point-of-sale terminal as claimed in claim 1, wherein establishing, by the point-of-sale terminal, the at least one communication channel comprises establishing, by the point-of-sale terminal, a telephone connection between the point-of-sale terminal and the at least one third party using a cellular telephone.

7. The point-of-sale terminal as claimed in claim 1, wherein establishing, by the point-of-sale terminal, the at least one communication channel comprises:
  establishing a Bluetooth connection between a cellular telephone and the point-of-sale terminal; and
  establishing, by the point-of-sale terminal, a connection between the point-of-sale terminal and the at least one third party using the cellular telephone.

8. The point-of-sale terminal as claimed in claim 1, wherein the at least one sensor is a pressure sensor.

9. The point-of-sale terminal as claimed in claim 1, wherein sending to the at least one third party at least one communication relating to the at least one sensor comprises sending a voice message.

10. The point-of-sale terminal as claimed in claim 1, wherein sending to the at least one third party at least one communication relating to the at least one sensor comprises sending a repeating voice message.

11. The point-of-sale terminal as claimed in claim 1, wherein sending to the at least one third party at least one communication relating to the at least one sensor comprises sending a text message.

12. The point-of-sale terminal as claimed in claim 1, wherein the non-transitory computer memory further stores computer instructions for controlling the computer processor to perform the steps of signaling to a video recording system to store a date/time when the at least one sensor sensed the measurable parameter that is outside of the threshold range.

13. The point-of-sale terminal as claimed in claim 1, wherein the non-transitory computer memory further stores computer instructions for controlling the computer processor to perform the steps of signaling to a video recording system to begin video recording.

14. The point-of-sale terminal as claimed in claim 1, wherein the non-transitory computer memory further stores computer instructions for controlling the computer processor to perform the steps of signaling to a video recording system to begin video recording if not already recording.

15. The point-of-sale terminal as claimed in claim 1, wherein wirelessly receiving information from at least one sensor external to the point-of-sale terminal that indicates that the at least one sensor has sensed the measurable parameter that is outside of the threshold range comprises receiving the measurable parameter using radio frequency communication.

16. The point-of-sale terminal as claimed in claim 15, wherein the radio frequency communication comprises Bluetooth communication.

17. The point-of-sale terminal as claimed in claim 1, wherein the at least one sensor comprises a water sensor.

18. The point-of-sale terminal as claimed in claim 1, wherein the at least one sensor comprises a switch.

19. The point-of-sale terminal as claimed in claim 1, wherein the at least one sensor comprises a temperature sensor.

20. The point-of-sale terminal as claimed in claim 1, wherein the threshold range is time dependent.

* * * * *